UNITED STATES PATENT OFFICE.

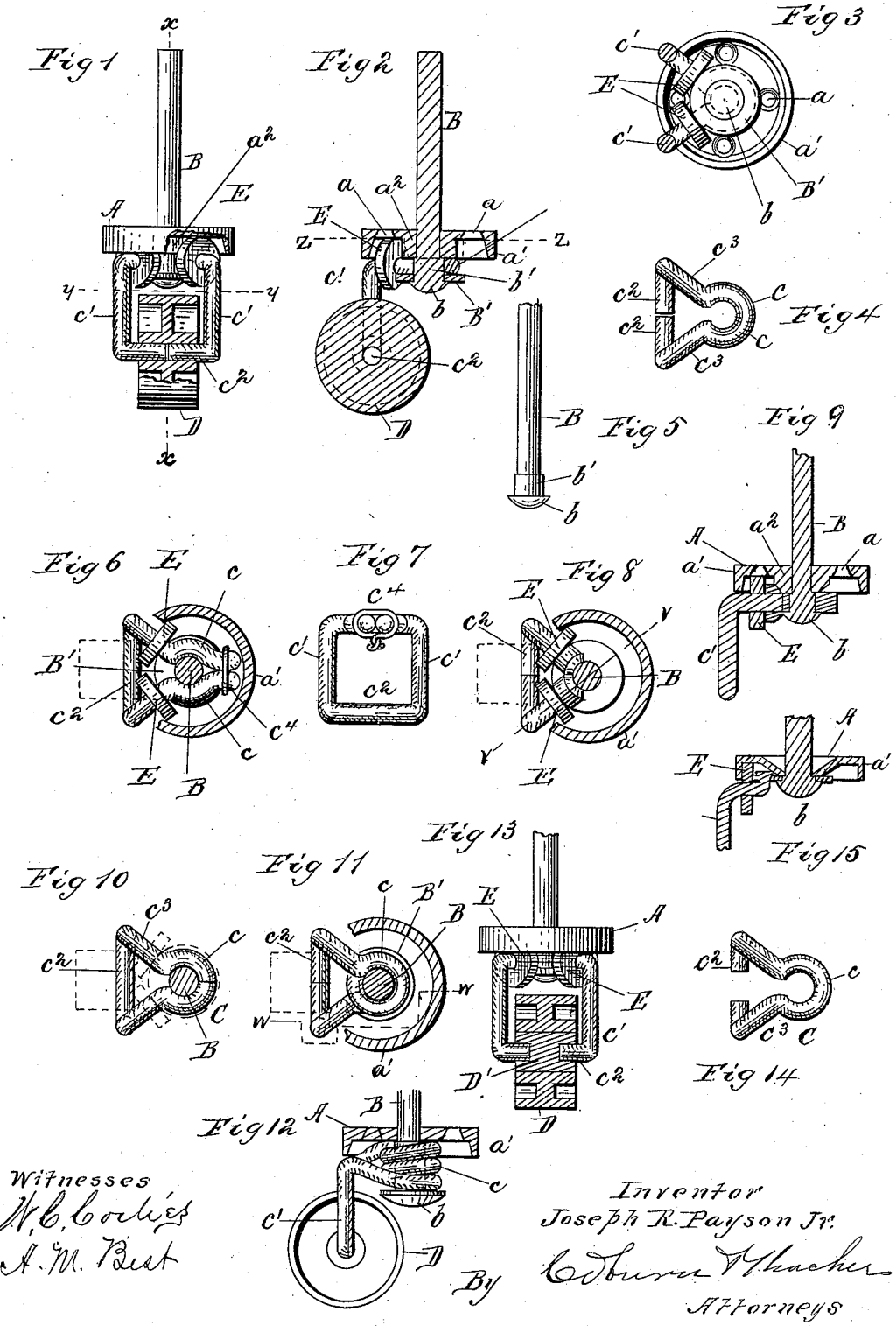

JOSEPH R. PAYSON, JR., OF CHICAGO, ILLINOIS, ASSIGNOR TO EDWARD PAYSON AND WILLIAM F. MAIN, BOTH OF SAME PLACE.

CASTER.

SPECIFICATION forming part of Letters Patent No. 324,156, dated August 11, 1885.

Application filed March 11, 1885. (Model.)

*To all whom it may concern:*

Be it known that I, JOSEPH R. PAYSON, Jr., a citizen of the United States, and residing at Chicago, in the county of Cook and State of Illinois, have invented certain new and useful Improvements in Casters, which are fully set forth in the following specification, reference being had to the accompanying drawings, in which—

Figure 1 is an elevation of a caster embodying my invention; Fig. 2, a sectional view of the same on the line $x\ x$ of Fig. 1. Fig. 3, a bottom plan section of the same taken on the line $y\ y$ of Fig. 1; Fig. 4, a detail plan view of the wire of yoke detached; Fig. 5, a detail view of the upright spindle detached; Fig. 6, a plan section of a modified form of my invention taken on a line corresponding to the line $z\ z$ of Fig. 2; Fig. 7, an elevation of the modified form of wire yoke shown in Fig. 6 detached; Fig. 8, a plan section, similar to Fig. 6, of another modified form of my invention; Fig. 9, a sectional view of the same on the line $v\ v$ of Fig. 8; Fig. 10, a plan view of another modified form of yoke; Fig. 11, a plan view, similar to Fig. 6, of another modified form of my invention; Fig. 12, a sectional view of the same on the line $w\ w$ of Fig. 11; Fig. 13, an elevation, partly in section, of another modified form of my invention; Fig. 14, a detail plan view of the modified form of yoke employed in the construction shown in Fig. 13; and Fig. 15, a sectional view of a modified form of the construction shown in Figs. 8 and 9.

Like letters refer to like parts in all the figures of the drawings.

My invention relates to casters for use on furniture, trucks, and like articles, its object being to produce a caster which is simple and inexpensive in its construction and effective in its operation; and to these ends my invention consists in the construction of the yoke or saddle which connects the floor-roller to the caster stem or spindle of a single piece of wire bent into proper form, swiveled around the stem or spindle, and forming the axis of the floor-roller.

It further consists in a novel application of anti-friction rollers between the yoke and caster plate; and it also consists in certain other novel features, all as hereinafter described, and pointed out in the claims.

In Figs. 1 to 5, inclusive, of the drawings I have shown one form of my invention, in which A represents the caster-plate, and B the stem or spindle passing through the same and into the material to which the caster is to be secured—such, for instance, as the leg of a chair. The caster-plate A is secured to the bottom of the chair-leg by means of screws passing through the holes $a$, formed in the plate for that purpose. The plate is also provided with a depending flange, $a'$, for the purposes hereinafter described. The lower end of the stem or spindle B is provided with an enlarged head, $b$, and the portion of the spindle between the said head and the hub $a^2$ of the caster-plate A is formed into an enlargement, $b'$, which provides a shoulder against which the caster-plate may rest. These parts, however, may be of any preferred construction, as they form no essential part of my present invention.

C indicates the yoke or saddle which connects the floor-roller D of the caster with the stem or spindle B. This yoke is constructed of wire of any suitable material—iron, steel, or brass, although I prefer steel on account of its superior strength—and is bent into shape by means of suitable forming-tools, being constructed of a single continuous piece of wire. The central portion of the wire forms a loop, as shown at $c$, surrounding the spindle B at the point $b'$, between the hub $a^2$ of the caster-plate and the enlarged head $b$ of the spindle.

If desired, a washer, B', may be inserted between the head $b$ and the loop $c$, forming an additional bearing for the loop, which turns freely around the spindle, thereby forming a swivel-connection between the yoke or saddle C and the spindle B. The ends of the wire which forms the yoke extend divergingly outward from the loop $c$, and are then bent downward, forming the horns $c'$ of the caster, the extremities of the wire being then bent horizontally, as shown in Fig. 1 of the drawings, to form an axis, $c^2$, upon which the floor-roller D is mounted.

Upon the horizontal portions $c^3$ of the wire yoke, which are intermediate between the loop $c$ and the uprights $c'$, I mount the anti-friction rollers E. These rollers are constructed of any approved form—such as the section of a cylinder or of a cone—and revolve freely upon the portions $c^3$ of the yoke, their upper portions bearing against the caster-plate A, between the hub $a^2$ and the flange $a'$ of which they travel, being guided in a circular path by means of the said flange and hub in an obvious manner, and receiving the greater portion of the weight of the article to which the caster is attached, thereby greatly reducing the friction at the swivel-joint between the yoke and the spindle.

It will be seen that the wire which forms the yoke or saddle C may be readily bent into the loop $c$ around the spindle, and its ends then passed through the wheels or rollers E and sprung or bent into the position shown in the drawings to form the axis of the floor-roller D. The wire may be somewhat flattened along the portions $c'$, which form the horns of the caster, if desired, in order to strengthen it against the transverse strain to which it is subjected in use.

In Figs. 6 and 7 of the drawings I have shown a modified form of yoke. The general form is identical with that already described; but instead of having the free ends of the wire at the point which composes the axis $c^2$ of the floor-roller, this axis is made from the central portion of the wire, the ends being used to form the loop $c$, while the extremities project somewhat beyond this loop, side by side, and are connected by means of a binding-piece, $c^4$, of smaller wire. These ends may, however, be connected by any other suitable means—such as soldering or brazing.

In Figs. 8 and 9 of the drawings I have shown still another modification in the form of the yoke. In this instance the loop $c$, which surrounds the spindle B, is formed by means of a cast-metal ring or hub, and the extremities of the wire, which form the remaining portion of the yoke, are cast into this ring, or, more properly speaking, the ring is cast around the ends of the wire, thereby making the said ring and the wire which composes the remainder of the yoke practically in a single piece. The extremities of the wire may be passed vertically through the ring and headed down or riveted, as shown in Fig. 15, or attached to the ring in any other well-known manner.

In Fig. 10 of the drawings is shown a modification which differs but slightly from the form shown in Figs. 6 and 7, the yoke being constructed in the same manner as the yoke shown in those figures, except that instead of extending the extremities of the wire beyond the loop proper, $c$, these extremities abut against each other, as clearly shown in the figure in question, and are secured by soldering or brazing.

In Figs. 11 and 12 of the drawings is shown a modification which differs but slightly from that shown in Figs. 1 to 5, and hereinbefore particularly described. In this instance the loop $c$, instead of being formed of only a single turn around the stem B, is formed with a double turn, as clearly shown in the two figures in question, and even a greater number of turns than two may be employed if it be deemed necessary or advantageous.

In Figs. 13 and 14 I have shown my improved yoke used in connection with a modified form of floor-roller. In this construction the extremities $c^2$, which form the support for the floor-roller, are sprung into the ends of a sleeve, D', which is capable of rotation upon the said extremities, or fixed thereon, if desired, and around which the floor-roller proper, D, revolves.

It is obvious that other forms of floor-roller may be used in conjunction with my improved yoke, as the particular construction of the roller forms no portion of my invention.

Instead of a single roller two floor-rollers may be used, one supported on each extremity of the wire which forms the yoke, the slight alteration in the construction necessary to effect this being sufficiently obvious to require no particular description here.

I am aware that anti-friction rollers have heretofore been applied to furniture-casters in various manners, and therefore do not wish to be understood as claiming the same broadly. In the constructions of this nature of which I am aware the various parts of the caster consist of a number of separate castings, which are costly in construction and in the labor required to properly finish and assemble them, and complicated in their general nature, whereas the construction which I have devised is extremely simple, cheap, and effective.

It is obvious that various modifications in the details of the construction hereinbefore described, and shown in the drawings, may be made without departing from the principle of my invention. The particular form of the yoke, the number of floor-rollers, and the construction of the spindle and caster-plate may be varied at pleasure, the essential feature of the invention being the construction of the pivot or support for the floor-roller, the body of the yoke or saddle, and the loop which forms the swivel-connection between the yoke and the spindle, of a single piece of wire or other analogous material capable of being bent into proper form. I therefore do not wish to be understood as limiting myself strictly to the precise details of construction hereinbefore set forth and shown in the drawings.

Having thus described my invention, what I claim as new, and desire to secure by Letters Patent, is—

1. The hereinbefore-described caster-yoke, constructed of a single piece of wire, and forming the caster-horns, the axle-bearings for anti-friction rollers, and the loop or swivel for the caster-stem, substantially as and for the purposes specified.

2. The combination, with the caster-stem and floor-roller, of a yoke or saddle connecting the two, and constructed of a single piece of wire, substantially as and for the purposes specified.

3. In a caster, the yoke C, formed of a single piece of wire, and having bearings for the floor and anti-friction rollers, and swiveled on the central stem, substantially as and for the purposes specified.

4. The combination, with the caster-stem B and floor-roller D, of the yoke C, formed of a single piece of wire having a loop, $c$, to receive the stem B, and an axial portion, $c^2$, to receive the floor-roller D, substantially as and for the purposes specified.

JOSEPH R. PAYSON, JR.

Witnesses:
GEO. A. PAYSON,
EDWARD PAYSON.